Oct. 4, 1966

G. L. NIGON 3,276,090

HOSE CLIPS

Filed July 14, 1964

Oct. 4, 1966　　　　　G. L. NIGON　　　　　3,276,090
HOSE CLIPS
Filed July 14, 1964　　　　　　　　　　　　　　　　5 Sheets-Sheet 2
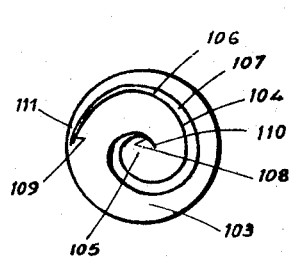
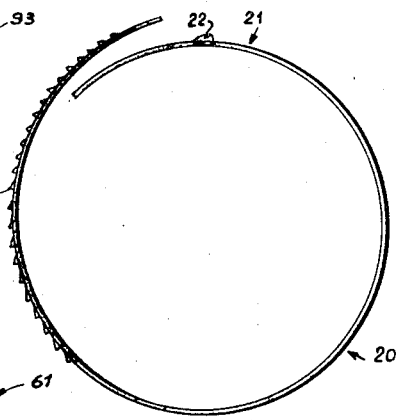
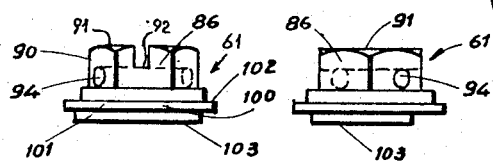
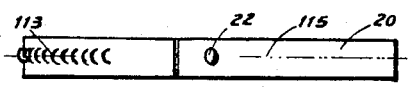
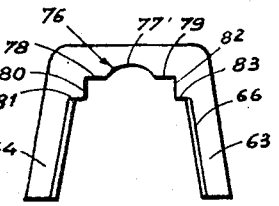
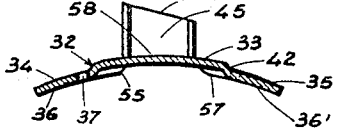
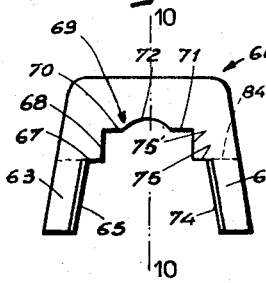
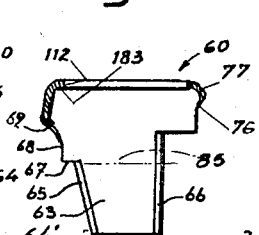
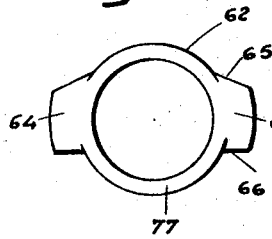
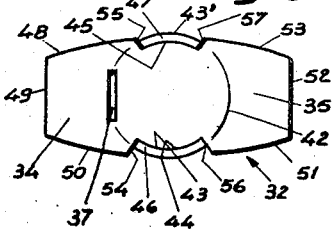
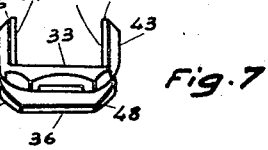

Oct. 4, 1966  G. L. NIGON  3,276,090
HOSE CLIPS

Filed July 14, 1964  5 Sheets-Sheet 3

Oct. 4, 1966

G. L. NIGON 3,276,090

HOSE CLIPS

Filed July 14, 1964

United States Patent Office 3,276,090
Patented Oct. 4, 1966

3,276,090
HOSE CLIPS
Georges Louis Nigon, 10 Rue Rapillon, Paris, France
Filed July 14, 1964, Ser. No. 382,599
Claims priority, application France, July 15, 1963,
941,478
6 Claims. (Cl. 24—274)

The present invention relates to a hose clip—or clamping ring—for pipes and the like, and more particularly to a hose clip of the type wherein the clamping of a band or strip portion around a pipe is achieved through the action of a member attached to the end of the band or strip and which engages with one or a plurality of supporting elements formed on the other end of the band or strip, the unclamping of the assembly being effected through an opposite action.

In hose clips or clamping rings of this type, of known construction, the actuating member is a screw the axis of which is substantially tangent to the peripheral circle along which the band or strip fits about the pipe or the like, said screw being carried by a case attached onto one end of the strip and locking the screw in position relative to a longitudinal movement with respect to the end portion of the strip onto which it is arranged, the other end portion of the strip, fitted with the supporting elements, being inserted between the external face of said first end portion of the strip and said screw.

It is an object of the invention to provide a hose clip or clamping ring wherein the actuating member, instead of being caused to rotate about an axis substantially tangential to the peripheral circle, is rotated about an axis substantially normal to the band portion it overlies.

It is a further object of the invention to provide a hose clip or clamping ring which resists particularly well any stresses to which it may be subjected during use and will thus satisfy any stringent requirements such as laid down in the employment of hose clips in certain modern techniques.

It is another object of the invention to provide a hose clip or clamping ring which remains fast about the pipe or the like, even when the action of an extremely high torque is exerted, as shown by means of practical torque tests effected with the device of the invention, the actuating member acting as a latch, with the slits in the band or strip representing abutment stops.

It is still another object of the invention to provide a hose clip or clamping ring of simple and economical construction, adapted for mass-production and automated methods.

It is also an object of the invention to provide a hose clip or clamping ring to be manufactured from various materials, the quality of which is selected in accordance with the particular intended application.

Another object of the invention consists in the provision of such a hose clip or clamping ring the storage and transportation of which may be assured under a reduced volume.

It is finally a further object of the invention to provide a hose clip or clamping ring which will satisfy the requirements as to the variable dimensions of pipes or the like to be clamped, this being achieved with a reduced number of parts, to the entire satisfaction of the user.

The invention will be best understood from the following description and appended drawings of a few embodiments of the device selected by way of example. In the drawings:

FIGURE 5 is a cross-sectional view through a plate forming part of the actuating member, according to one embodiment of the clamping device.

FIGURE 6 is a plan view thereof.

FIGURE 7 is an elevational view thereof.

FIGURE 9 is an elevational view of a cap member, according to one embodiment thereof.

FIGURE 10 is a cross-sectional view along line 10—10 of FIGURE 9.

FIGURE 11 is a plan view corresponding to FIGURE 9.

FIGURE 12 is an elevational view, but through a side opposite to that shown in FIGURE 9.

FIGURE 13 is an elevational view of an actuating or head member.

FIGURE 14 is an elevational view at right angles with respect to the view in FIGURE 13.

FIGURE 15 is a plan top view.

FIGURE 16 is a plan bottom view.

FIGURE 17 is a perspective view of a head member according to an alternative embodiment.

FIGURE 18 is a front view of a circularly shaped band or strip, according to the invention.

FIGURE 19 is a corresponding side view thereof.

Figure 1:
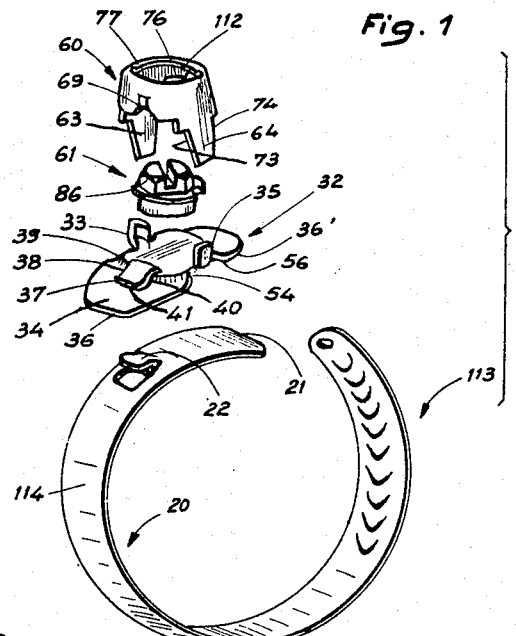
FIGURE 1 is a perspective view of a hose clip or clamping ring according to a first embodiment of the invention, showing the various constitutive elements in an exploded view, before being assembled.

The hose clip or clamping ring according to the invention comprises a clamping band or strip 20 (FIGS. 1 and 2), of steel, derived by cutting of an elongated rectangular strip from a sheet and subsequently bending the strip into circular shape. The bending may be effected manually at a desired time. Towards one of its ends 21, the strip is formed with a hook 22, obtained simply by cutting out and depressing the band by means of a convenient tool. Said hook, in the embodiment shown in FIGURE 3, has a rectilinear edge 23, extending parallel to the generating lines of the cylindrical ring constituting the band or strip, and two junction edges 24 and 25, the sides of the cut-out portion formed in the band by producing the hook being designated by the reference numerals 26, 27, 28.

Figure 4:
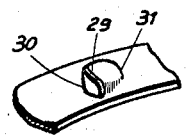
FIGURE 4 is a similar view to that in FIGURE 3, according to another embodiment.

According to the alternative embodiment illustrated in FIGURE 4, the hook projects radially less relative to the cylindrical shaped ring of the band or strip and is in the form of a crescent, with one curved edge 29 corresponding to the cut-out portion 30 of the band.

Figure 3:
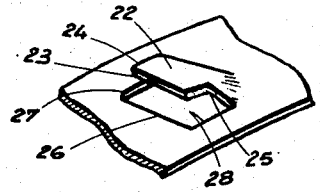
FIGURE 3 is a perspective view, on an enlarged scale, of a portion of the strip or band formed with a hook member, in accordance with one embodiment thereof.

In certain embodiments, the band or strip may comprise not one such hook as shown in FIGURE 3 but two such hooks as shown in FIGURE 4.

Figure 2:
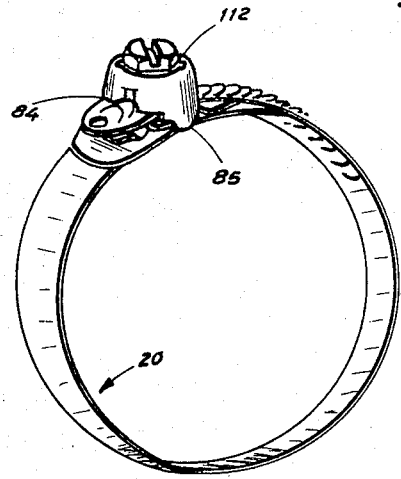
FIGURE 2 is a perspective view of said clip or clamping ring, with the various elements mounted in operating position.

Said hook 22 or 31 is used to secure an actuating device (FIGS. 5 to 7) comprising a plate 32, formed from a steel sheet, of a generally oval shape, which comprises a body or base 33, substantially circular and flat, extending into two supporting pieces 34 and 35 the inner faces 36 and 36' of which are curved to substantially conform to the shape of the pipe to be clamped. A studhole 37, formed for the passage of hook 22 or hook 31, is present at the union between body 33 and one of the supports (suport 34 in the example illustrated), the sides of the stud-hole being designated by reference numerals 38, 39, 40 and 41 (FIG. 1). The cylindrical raised edge 42 for the union between body 33 and supports 34 and 35 rises along two tabs 43 and 43' in two diametrically opposed zones, the internal faces of which 44 and 45 are those of a cylindrical surface the axis of which is the one of circular body 33; the upper edges 46 and 47 of said tabs may slant towards the plane of said body, as shown in FIGURE 5. Support piece 34 is limited by sides 48, 49, 50 and support piece 35 by sides 51, 52, 53. The sides of support piece 34 joined to raised edge 42 define notched elements designated by reference numerals 54 and 55 and the sides of support 35 joined to said raised edge defined notched elements 56 and 57. Plate 32 is shaped to conform with the surface of revolution of the pipe to be clamped, thus assuring a perfect seal.

The stud-hole 37 in the embodiment illustrated in FIGURE 1 differs slightly from that shown in FIGURES 5 and 6, the latter being in the shape of a narrow rectangle and adapted to cooperate with a hook as shown in FIGURE 3.

Figure 8:
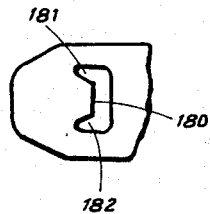
FIGURE 8 is a partial view similar to that illustrated in FIGURE 6, of an alternative embodiment.

According to another embodiment, as shown in FIGURE 8, the stud-hole is cut out such as to present a tab 180 bordered by two slots 181 and 182, a stud-hole of this type being used in cooperation with a hook as shown in FIGURE 4.

The upper face 58 of the circular body 33 defines, with a cover or cap 60 (FIGS. 9 to 12) a housing adapted to receive an actuating member 61. Cap 60, which may be formed of pressed sheet, is of a generally truncated-conical shape. Its body or side surface 62 is cut out along two lugs 63 and 64. The contour of lug 63 comprises an end edge 64' and two slanted edges 65 and 66, edge 66 being longer than edge 65 in the illustrated embodiment. Edge 65 connects to a transversal edge 67 which connects to a longitudinal edge 68, and the latter is formed with a transversal curved edge 69 comprising two portions 70 and 71 forming part of the cross-section of the truncated cone, and a junction curvature 72. Lug 64, symmetrical to lug 63 relative to a mean longitudinal plane, is equally limited by two edges 73, 74, the junction edges with curvature 69 being designated by reference numerals 75 and 75'.

The cut-out portion at the diametrically opposed side is similar to that just described, except that curvature 76 is at a closer distance to the annular raised edge 77 than curvature 69. Curvature 76 comprises the curved central portion 77' and the substantially plane portions 78 and 79 and the cut-out portion extends through sides 80, 81, and 82 and 83, the latter connecting to side 66 of lug 63.

The assembly of cap or cover 60 with plate 32 is effected by folding or bending over lugs 63 and 64 along lines 84 and 85, shown in broken lines, the width of the lugs being such that the latter are accommodated and maintained between the edges or sides 54 and 56, the one hand, and 55 and 57 on the other hand, thus forming a crimping connection.

The cap member may also be in the shape of a circular truncated cone, having its large base at the upper end. In this case, a cup-shaped member closes the cap, after positioning of the actuating unit.

The actuating element generally designated by reference numeral 61, and which will now be described with reference to FIGURES 13 through 17, is thus maintained in a housing defined by body 33 of the plate and the side wall of the cap member, with only its head portion 86 projecting outwardly. Preferably, head portion 86 has its side surface 90 formed hexagonally so as to cooperate with a pipe-wrench or with a tap-wrench, its upper face being formed with a slot 92 for the insertion of a screw-driver. In the embodiment shown in FIGURE 17, slot 93 does not extend over the whole diameter of head 91, avoiding the slippage of the screw-driver without it being necessary to provide to this end. According to an alternative embodiment, the head portion presents two crossed slots to receive a corresponding end-portion of a screw-driver. Body 100 of the head has a slightly greater diameter than that of the hexagonal side 90 and is formed at its base with a peripheral circular rim or shoulder 101 the upper face 102 of which cooperates with the lower face 183 of flange 77 for guiding rotationally the actuating unit 61. Said shoulder may comprise a notch adapted to receive a stop pin. Head portion 86 is preferably formed with a trans bore 94 extending diametrically and adapted to receive a sealing thread. There is also provided a slanted bore. The actuating unit comprises on its lower face 103, and projecting therefrom, a spirally shaped rib 104. Specifically, said rib 104 is limited by two longitudinal or cylindrical sides or faces 106 and 107 the directrix of which is a spiral, the distance of each of the points of said first spiral relative to the axis 105 of the actuating unit, which is substantially coincident with the axis of the cap member, increasing progressively when moving along said spiral, from its inner end 108 up to its outer end 109, as is also progressively increasing the distance of the points of spiral 107 with respect to axis 105, from the inner end 110 up to the outer end 111 of said spiral. The thickness of rib 104 is substantially constant, except towards the end portions thereof, which are progressively thinner.

The term "spiral" as applied in the present specification, is in no way limited to its algebraic definition of a spiral, but, in a more extensive manner, the term applies to a curve which, when scanned radially by a straight line rotating about the trace of the rotational axis of the actuating unit, has its various points meeting with said straight line at an increasing or decreasing distance relative to said trace, according to the direction of scanning. Said spiral may thus be formed of portions of curves, of simple formation, and, in particular, of one or a plurality of arcs of a circle; a few embodiments being described hereinafter.

When actuating the head portion either by means of a wrench in engagement with the hexagonal side thereof, or by means of a screw-driver engaging in the slot or crossed slots, the head is driven in a rotating movement, the guiding being effected accurately, through cooperation of the head and the cap, more precisely through the cylindrical bearing of body 100 of the head with the cylindrical bearing 112 (FIG. 10) of flange 77 of the cap.

The end of the strip opposite to the end 21 comprises on the external face of the strip, a plurality of curved projections 113 (FIGS. 18 and 19) or half-slits, essentially identical and parallel to one another, substantially symmetrical on both sides of median plane of symmetry 115 of strip 20. Said projections, adapted to cooperate with the spiral cylindrical surface 106 (FIG. 21) in their portion adjacent to the plane of symmetry 115, and having the same pitch as that of the spiral, present, in said portion, a curvature radius which is substantially lower than that of spiral 106.

Said projections may simply result from swaging strip 20 by means of a conveniently shaped tool, the swaging operation being advantageously carried out when the strip is flat, the tool having a to-and-fro movement and the strip advancing with a continuous movement.

Figure 21:
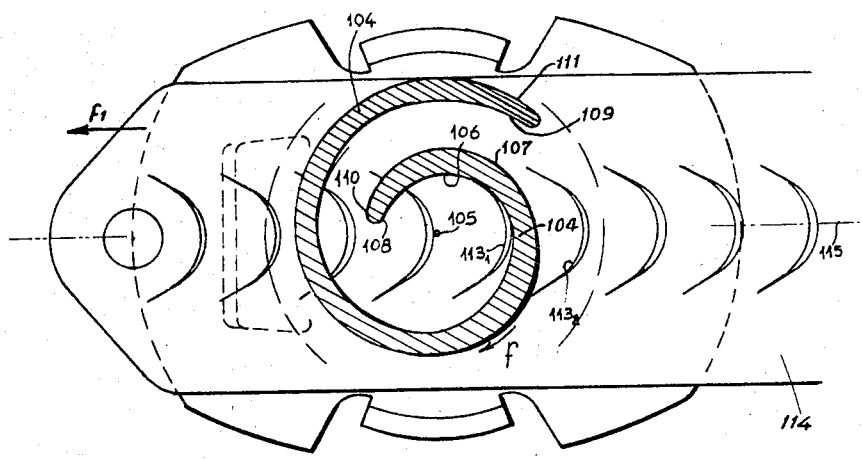
FIGURE 21 is a corresponding plan view thereof, with certain parts being omitted for clearness of the drawing.

FIGURE 21 shows clearly that the spiral rib 104 moving in rotation about axis 105, in the direction of arrow $f$, urges through its inner face 106 the projection $113_1$ in a direction assuring the motion of the strip in the direction of arrow $f_1$. Before however, due to the rotation, the inner end 108 of rib 104 will have left projection $113_1$, the end portion 109 of said projection will have reached projection $113_2$, so that, during the rotation of the actuating unit, when the inner end portion of rib 104 has left projection $113_1$, it is the other end portion of said rib which will actuate the strip through projection $113_2$; thus, a continuous linear forward motion of the band or strip is obtained.

Figure 22:
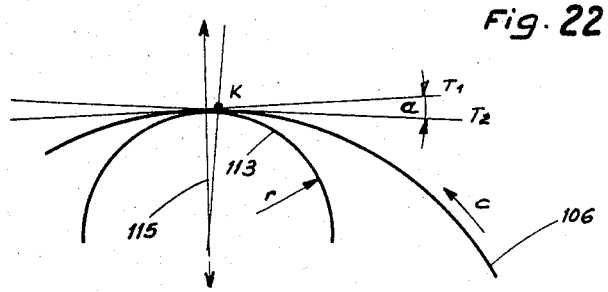
FIGURE 22 is a diagram in connection with the embodiment of the device.

FIGURE 22 shows schematically, through a cross-section of a cylinder parallel to that of the non swaged surface 114 of the band or strip, the plane $T_2$ tangent, in common, to the internal face of spiral 106 and rib 113, plane $T_1$ being tangent to said rib at its intersection with the medium transversal plane of symmetry 115. The torque applied to the actuating unit is proportional to angle $a$ between both tangential planes.

The swaging of strip 20 resulting in the formation of the projections affects only a comparatively small portion of the width thereof, of the order of one third of said width, so that the resistance of the band to the various stresses exerted thereon remains substantial.

Figure 20:
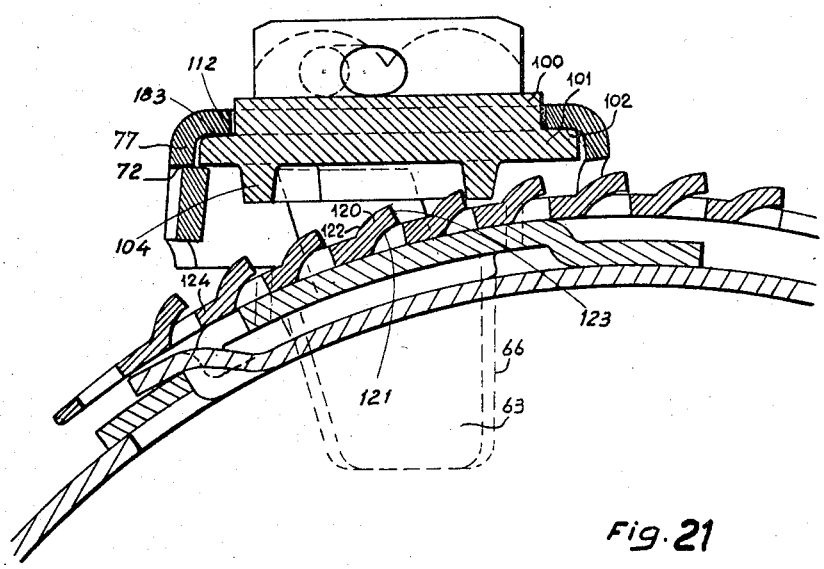
FIGURE 20 is a cross-sectional view, on an enlarged scale, of a hose clip or clamping ring according to one embodiment of the invention, in the neighborhood of the actuating device.

In the embodiment illustrated in FIGURE 20, each one of the swaged portions constitutes a lug 120 having its inner face 121 formed as a curve, an outer face 122, and an actuating edge 123 adapted to cooperate with the spiral rib. In this embodiment, the non swaged portions 124 have a circular span, as measured about the axis of the clamping ring, substantially equal to that of the swaged portions.

Figure 23:
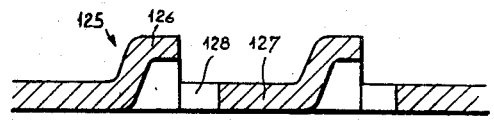
FIGURE 23 is a cross-sectional view of a band or strip according to one embodiment of the invention.
Figure 24:
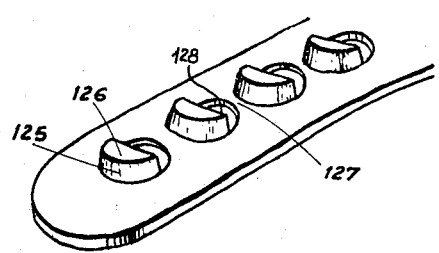
FIGURE 24 is a perspective view thereof.

In the embodiments according to FIGURES 23 and 24, the swaging is effected in such a manner that each one of the projections 125 is formed with an external face 126 substantially parallel to the non swaged portion 127 of the strip. The more marked swaging causes semicircular orifices or perforations 128 to appear. In this embodiment, the non swaged portion 127 has an angular span slightly larger than the swaged portion 126.

Figure 25:
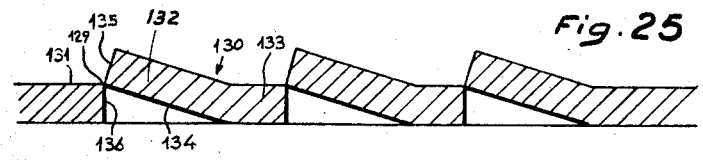
FIGURE 25 is a view similar to that in FIGURE 23, according to an alternative embodiment.
Figure 26:
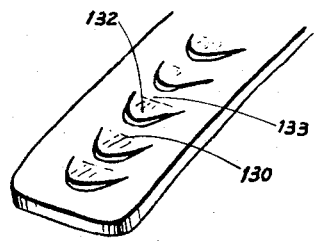
FIGURE 26 is a view similar to that in FIGURE 24, according to said alternative embodiment.

In the embodiment according to FIGURES 25 and 26, the swaging is effected up to the point wherein the inner face 129 of a projection 130 is flush with the external face 131 of the strip. The swaged portion 132 has, in this case, an angular span substantially larger than the non swaged portion 133, the swaging being limited to obtain slanted faces 134.

Figure 27:
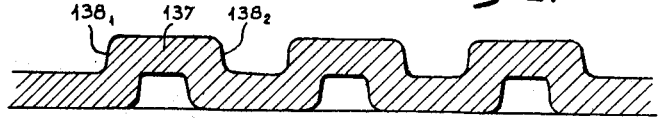
FIGURE 27 is a view similar to that of FIGURES 23 and 25, but in accordance to a further alternative embodiment.
Figure 28:
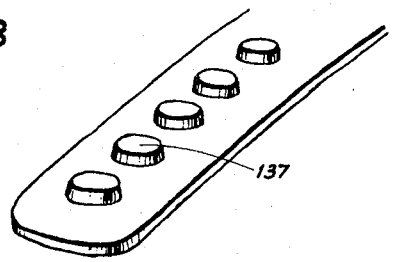
FIGURE 28 is a view similar to that in FIGURES 24 and 26, for said alternative embodiment.

Whereas in the embodiment illustrated in FIGURES 23 and 24, openings were formed through swaging in the band or strip, and, in the embodiment shown in FIGURES 25 and 26, the actuating edge 135 was connected to edge 136 of the cavity produced by such swaging, in the embodiment illustrated in FIGURES 27 and 28, no thickness reduction of the band or strip in a plane perpendicular to the axis of the clamping ring is produced, through the formation of the projection. In this embodiment, the projections 137 are substantially circular and are effective to operate through their edge 138 which lies over a whole circumference, such a circular projection being able to be urged by a lateral member either along its zone $138_1$ or along its diametrally opposed zone $138_2$. In the illustrated embodiment, these circular projections are obtained through stamping of the strip or band.

Additional holes may be provided, either to assist in handling of the bands, or for a possible attachment of labels—in view of marking—or else for sealing purposes.

Figure 29:
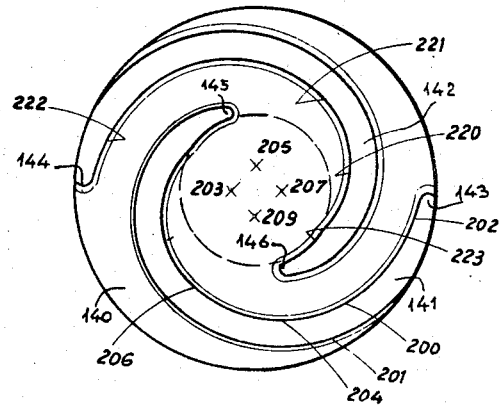
FIGURE 29 is a view of the internal face of an actuating head member, formed with two driving ribs.
Figure 30:
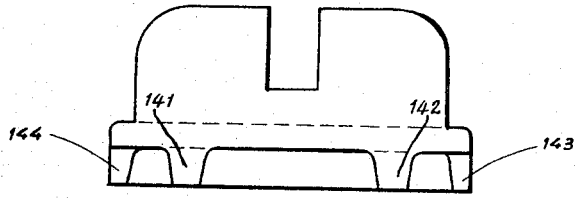
FIGURE 30 is an elevational view of such a head member.

In the embodiment shown in FIGURES 29 and 30, the actuating unit comprises on its inner side 140 two spiral ribs 141 and 142. The external origin 143 of rib 141 is diametrally opposite to the external origin 144 of rib 142; each one of the ribs extends on a span greater than 180°, of the order of 250° in the embodiment shown; the inner end portions 145 and 146 are diametrally opposed.

In this embodiment, the parallel surfaces 200–201, defining rib 141, comprise a first portion 202 corresponding to face 200 centered on a first center 203 and which extends over a span of about 30°; a second portion 204 is centered on a second center 205 and extends over a span of about 90°; finally, a third portion 206 is centered on a third center 207 and extends over a span of about 90°. The four centers 203–205–207–209 form the summits of a square symmetrical with respect to the axis.

As to the rib 142, portion 220 is centered about center 203 and has a span of about 90°, portion 221 being centered around center 209 and portion 222 around center 207.

Figure 31:
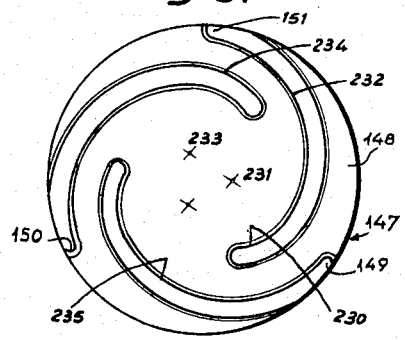
FIGURE 31 is a view similar to that in FIGURE 29, but corresponding to an alternative embodiment.
Figure 32:
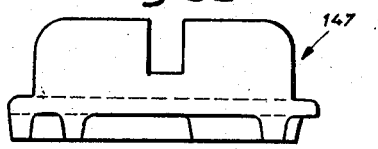
FIGURE 32 is an elevational view corresponding to FIGURE 31.

In the embodiments shown in FIGURES 31 and 32, the actuating unit 147 comprises on its inner face 148 three spiral ribs the external origins of which 149, 150 and 151 are angularly deflected by 120°, each one of the ribs having an angular span of the order of 150 to 160°. Rib 151 for instance comprises a first portion 230 centered about a first center 231, a second portion 232 centered around a second center 233. The latter is also the center of the first portion 234 of rib 150 and center 231 is the center of the large-span portion and of a large radius 235 of rib 149.

Figure 33:
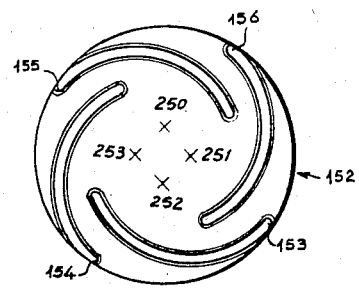
FIGURE 33 is a plan view similar to that in FIGURE 31, for still another embodiment.
Figure 34:
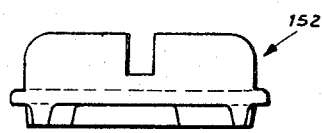
FIGURE 34 is a corresponding elevational view.

In the embodiment shown in FIGURES 33 and 34, the actuating unit 152 comprises four identical ribs the external origins of which 153, 154, 155 and 156 are deflected by 90°, each one of the ribs extending over an angular span of about 120°. Each rib is circular, the centers 250, 251, 252 and 253 corresponding respectively to ribs 156–153–154 and 155 being located at the ends of two perpendicular diameters of a circle centered on the axis, as clearly shown in the figure.

The connection through hooking of the actuating device constituted by the assembly of the plate, cap, actuating member and the band or strip, enables, on one hand, the separate storing of the bands, and on the other hand of the actuating units, and equally the separate packing of the strips and of the actuating devices for transportation purposes.

An actuating device may be mounted on a projection-fitted band of any length, thus enabling to satisfy, with a comparatively small number of parts, the various requirements in practice.

It is to be understood that the clamping ring may be made not only of steel, but also of plastic.

What is claimed is:

1. A clamping ring comprising an open band a first end of which comprises a series of transverse supporting portions in longitudinal alignment, an actuating device fixed at the other band end and comprising a case with two diametrally opposed notches for the passage of the end of the band with the supporting portions, an actuating member rotatively mounted in said case and presenting on its inner face opposite the band a rib cooperating with said supporting portions the distance of which relative to the rotation assembly axis of the actuating member in the case is variable, and a plate which is shaped as a band section and which includes opposed upwardly extending flanges, said case being secured to said plate with the actuating member rotatably supported therebetween by cooperation of said opposed upwardly extending flanges with the undersurface of a radially extending shoulder formed on the actuating member and prevented from inadvertent displacement therefrom by means formed on the case cooperating with the upper surface of the shoulder, said plate having means for securing it to said second end of the band.

2. A ring according to claim 1, wherein the rib is a spiral.

3. A ring according to claim 1, wherein the rib comprises a portion in the shape of an arc of a circle the center of which is spaced from said axis of rotation.

4. A ring according to claim 1, wherein the rib is formed by a plurality of arcs of a circle connecting tangentially.

5. A ring according to claim 1, wherein the internal face of the actuating member comprises a plurality of ribs.

6. A ring according to claim 5, wherein the relative arrangement of the ribs is such that one rib derives from another by a rotation about said axis by a proportion of a circumference, according as there are numbers of ribs.

References Cited by the Examiner

UNITED STATES PATENTS

| 240,314 | 4/1881 | Fitzgerald | 24—68 X |
| 278,762 | 6/1883 | Baker | 24—68 X |
| 2,395,273 | 2/1946 | Hill et al. | 24—274 |
| 2,907,086 | 10/1959 | Ord | 24—19 |
| 3,035,319 | 6/1962 | Wolff | 24—19 |

FOREIGN PATENTS

| 1,123,889 | 6/1956 | France. |
| 526,139 | 9/1940 | Great Britain. |
| 589,431 | 6/1947 | Great Britain. |
| 607,595 | 9/1948 | Great Britain. |

WILLIAM FELDMAN, *Primary Examiner.*

D. GRIFFIN, *Assistant Examiner.*